United States Patent [19]

Nikodem et al.

[11] Patent Number: 4,786,784
[45] Date of Patent: Nov. 22, 1988

[54] METHOD FOR PRODUCING AN ELECTRICALLY HEATED WINDOW ASSEMBLY AND RESULTING ARTICLE

[75] Inventors: Robert B. Nikodem, Toledo; Peter J. Tausch, Perrysburg; Ronald D. Goodman, Toledo; Robert M. Felt, Toledo; Michael J. Grogan, Toledo, all of Ohio

[73] Assignee: Libbey-Owens-Ford Co., Toledo, Ohio

[21] Appl. No.: 147,015

[22] Filed: Feb. 5, 1988

Related U.S. Application Data

[63] Continuation-in-part of Ser. No. 14,098, Feb. 17, 1987.

[51] Int. Cl.$^4$ ............................................. H05B 3/16
[52] U.S. Cl. ..................................... 219/543; 219/203; 219/522; 204/192.26; 427/165; 428/215
[58] Field of Search ............... 219/542, 543, 546, 547, 219/522, 203; 204/192.1, 192.17, 192.26, 192.27, 192.28, 192.29; 427/162, 163, 164, 165; 428/213, 215, 216

[56] References Cited

U.S. PATENT DOCUMENTS

| | | | |
|---|---|---|---|
| 4,166,876 | 9/1979 | Chiba et al. | 428/215 |
| 4,385,226 | 5/1983 | Sauer | 219/522 |
| 4,388,522 | 6/1983 | Boaz | 219/522 |
| 4,462,883 | 7/1984 | Hart | 204/192 C |

Primary Examiner—E. A. Goldberg
Assistant Examiner—M. M. Lateef
Attorney, Agent, or Firm—Marshall & Melhorn

[57] ABSTRACT

A method for forming a vehicle window assembly includes applying a band of an opaque ceramic enamel material to a predetermined peripheral portion of a sheet of relatively flat glass, and heating the glass to a prefire temperature to fuse the opaque material to the glass. An electrically conductive material is applied to the band in a predetermined pattern to form a pair of bus bars typically along the top and bottom edges of the sheet of glass. The glass is again heated to fire the bus bar material and soften the glass for bending into a desired window shape. A mask is applied to the bus bars for later connection of electrical leads and the sheet of glass is washed prior to the next operation. An electrically conductive film is applied to the second surface of the sheet of glass and electrically connected to the bus bars. The sheet of glass is laminated to a sheet of plastic material which covers the electrically conductive film and, typically, the plastic sheet is laminated to a second sheet of glass which has been preformed, i.e., bent, to conform to the first sheet. Electrical leads are attached to the bus bars to complete the window assembly. The electrically conducting film and glass sheet composition and thickness are chosen to maximize for the window assembly the desired performance characteristics of resistance, transmission, reflection and color-all of which are mutually interactive.

28 Claims, 2 Drawing Sheets

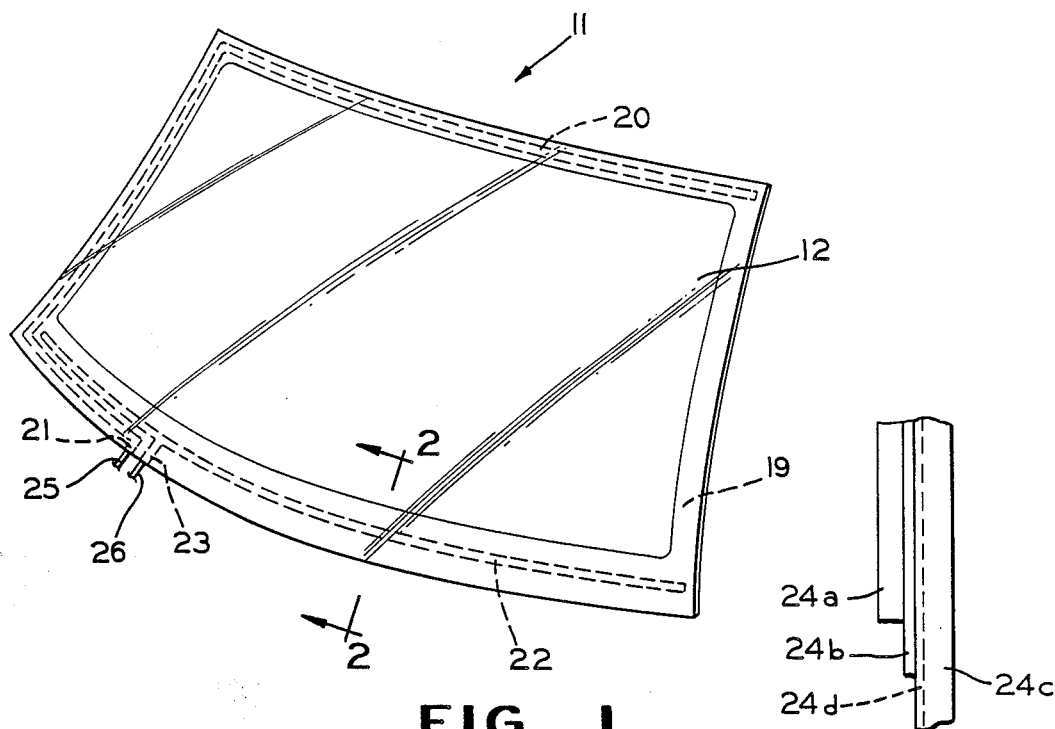
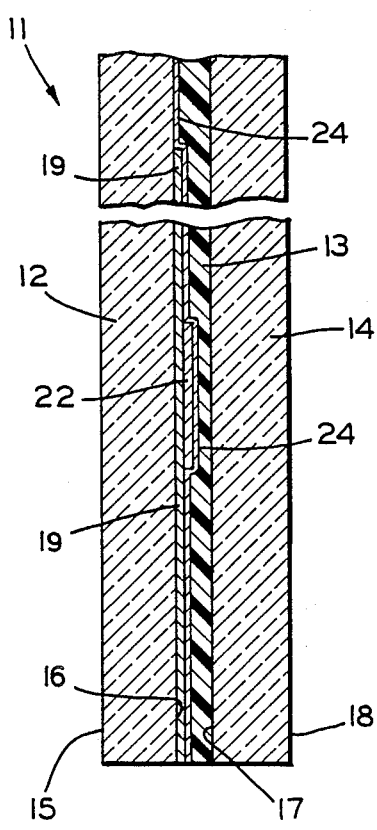
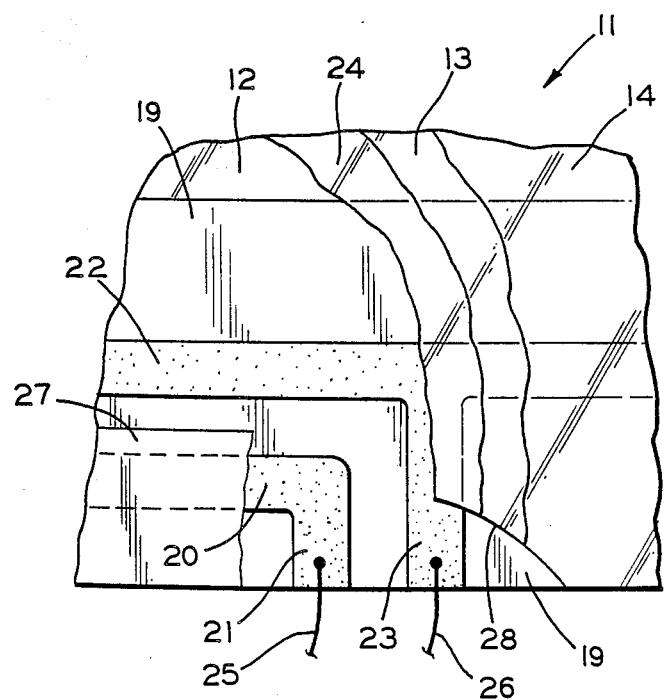

METHOD FOR PRODUCING AN ELECTRICALLY HEATED WINDOW ASSEMBLY AND RESULTING ARTICLE

RELATED APPLICATION

This application is a continuation-in-part of U.S. application Ser. No. 07/014,984; filed Feb. 17, 1987 and now abandoned.

BACKGROUND OF THE INVENTION

The present invention concerns a window assembly and method for producing same and, in particular, a method for producing curved window assemblies which are electrically heated.

Motor vehicles of recent manufacture are equipped with various systems for defogging and deicing the windows. Generally, the windshield has warm air blown across its interior which is generated by the use of heat transferred from the internal combustion engine driving the vehicle to the engine cooling system and further to air circulated by the vehicle ventilation system. In such a case, there is a period of time between the starting of the engine and the time that sufficient heat is being generated in the cooling system in order to provide the defogging and deicing warm air. Depending upon the temperature conditions and the time the vehicle has been sitting idle without its engine running, the period of time before sufficient heat is available to accomplish the desired function can be significant.

An alternative system generates heat from electrical energy obtained from the vehicle electrical system. Many different systems have been proposed for electrical heating including the placement of an electrically conductive transparent coating on the windshield and embedding fine wires in a laminating interlayer of the windshield. However, such a system is expensive to manufacture due to vision requirements including the desire to reduce reflections. In addition, the fine wires and conducting films utilized are difficult to install and are subject to circuit interruption due to thermal and mechanical stresses.

U.S. Pat. No. 2,954,454 discloses an electrically conducting curved glass windshield and a method of producing the same. A flat sheet of glass has strips of fusible material applied thereto in spaced areas and preferably along the opposed margins of the sheet in substantially parallel relation. The glass sheet is heated substantially to its point of softening and simultaneously the fusible material is fused to the glass to form electrodes or bus bars. The surface of the heated glass sheet is sprayed with a suitable material, such a a tin halide, to form upon the sheet a transparent, continuous though extremely thin electrically conducting coating of tin oxide. The glass sheet is cooled in air at room temperature and the electrodes are connected to suitable leads which in turn will be connected to the vehicle electrical system. The glass sheets are paired with a second glass blank on a bending mold and heated such that the glass settles into the desired windshield shape. The glass is slowly cooled and cut to the desired shape.

U.S. Pat. No. 3,001,901 discloses a method of producing electrically conductive articles such as a transparent electrically conductive film on a plastic sheet. A sealer coating is placed on the sheet while it is in a flat form. An adhesive layer formed of a metal oxide is placed in contact with the sealer coating and a transparent electrically conductive film is deposited on the adhesive layer. The composite structure is heated to an elevated temperature above the normal temperature to which the sheet will be heated by the electrically conductive film. At the elevated temperature, electrodes are placed in contact with the conductive film and the article is allowed to cool to place the electrodes in compression. In the heated state, the sheet can be bent and/or laminated to another plastic sheet to produce an assembly.

U.S. Pat. No. 4,373,130 discloses a windshield having an electric resistance heating element located in a lower region normally outside the driver's field of vision where at least one windshield wiper is located in the rest position of the wiper. A continuous layer of a heat radiation absorbing ceramic material opaque to ambient light and coextensive with the area of the heating element is disposed on the windshield between the heating element and the windshield wiper to shield the heating element from view from the front of the windshield and to uniformly distribute heat over the lower portion of the windshield. The windshield is manufactured by applying a continuous closed layer of a printable baking paste to the surface of a glass pane by a screen printing process. The layer is dried and imprinted with an electric heating resistance material. The electric heating resistance material is dried and an additional continuous closed layer of a printable baking paste can be printed on the electric heating resistance material. The baking is done in a single heat treating process. In a laminated windshield, the first layer and the electric heating resistance material are applied to the inner surface of the outer pane. The second layer of printable paste is applied to the outside surface of the inner glass pane. After all the layers have been applied and dried, the two glass panes are placed together and subjected to joint bending with heating.

U.S. Pat. No. 4,407,847 discloses a process for manufacturing electrically heated backlites. An opaque band is applied to the surface of a glass sheet with a radiation curable paste that includes both a filler material which can fuse to the surface of the glass when heated to a fusion temperature and radiation curable material which is heat decomposable into complements which are non-reactive with the glass sheet when heated to a fusion temperature. The radiation curable material is cured to temporarily bond the radiation curable paste to the glass sheet. A pattern of electrically conductive material is deposited on the surface of the glass sheet and contains at least one component which is heat fusible with the surface of the glass sheet when the glass sheet is heated to the fusion temperature. The glass sheet is passed through a heating lehr which is operated at a temperature sufficiently high to heat the glass sheet to the fusion temperature.

One material commonly used for bus bars is silver. However, one problem encountered with the use of silver material for a bus bar is bleed-through of the silver through a ceramic enamel band utilized to hide the bus bars. Such a condition is visually unacceptable to vehicle manufacturers.

SUMMARY OF THE INVENTION

The present invention concerns a method for forming electrically heated windshield assemblies with hidden bus bars whereby the condition of "bleed-through" is eliminated. A band of ceramic enamel material is applied to a surface of a glass sheet adapted to form an inboard surface of the windshield (designated either the

2 or #3 surface of a windshield) while the sheet is in the flat state. The glass is heated to prefire the band of enamel and to establish desired color development. One or more bus bars are applied to the surface of the enamel band utilizing a metallic material such as a silver paste. The sheet of glass is heated to both fire the bus bar and soften the sheet for bending to the desired shape. An electrically conductive film is applied to the surface of the glass sheet after it has been bent either while the sheet is still in the heated state or after the sheet has been cooled. The filmed sheet is then assembled with an intermediate plastic sheet and a second glass sheet bent to the same curvature as the filmed sheet to form a laminated windshield assembly.

The electrically heated window assembly in accordance with the invention is neutral in color as compared with currently available electrically conducting units which exhibit an objectionable copper or bronze tinted appearance. Such color neutrality is due to a unique combination of layer combinations and thicknesses making up the electrically conducting film stack and is best defined by reference to the CIELAB color scale system as hereinbelow explained. More particularly, the film is a thin, millionths-of-an-inch, three layer oxide-metal-oxide film, deposited on the #2 or #3 surface of the windshield preferably via sputtering.

The CIE (Commission Internationale de l'Eclairage) established several illuminants of known spectral distributions as standards for use in color measurements. Tristimulus colorimetry is based upon the fact that any color can be reproduced by three other colors of controlled amounts. Tristimulus color scales include the X,Y,Z system which represents the ratios of the integrals of light reflected from a sample being measured to the integrals of light reflected from a perfect diffuser, when both are multiplied wavelength by wavelength by the response curve of the Standard Observer and by the Illuminant II. The 1931 CIE Standard Observer response curves define the amount of each of three primary lights (green, amber and blue) needed to reproduce energy of each wavelength from 380 nm to 750 nm wherein the green curve is the standard luminosity curve for the human eye (x is amber, y is green and z is blue).

The L,a,b tristimulus system has gained wide acceptance in recent years. L represents the mathematical approximation of the non-linear black-white response of the eye. A perfect white has a value of one hundred and a perfect black has a value of zero. The values of "a" and "b" identify the hue and chroma or color of the sample. A plus value of "a" indicates redness and a minus value indicates greenness. A plus value for "b" indicates yellowness and a minus value indicates blueness. The 1976 CIE L*,a*,b* scale or CIELAB scale has the following relationship with the CIE x,y,z scale:

$$L^* = 116(Y/Y_o)^{\frac{1}{3}} - 16$$

$$a^* = 500((X/X_o)^{\frac{1}{3}} - (Y/Y_o)^{1/3})$$

$$b^* = 200((Y/Y_o)^{\frac{1}{3}} - (Z/Z_o)^{1/3})$$

where $X/X_o$, $Y/Y_o$ and $Z/Z_o$ are each greater than 0.01 and $X_o$, $Y_o$, $Z_o$ define the color of the nominally white object-color stimulus.

In accordance with the invention, the desired neutral color is defined as having the following CIELAB scale parameters: $L^* = 34.7 \pm 3$; $a^* = 0 \pm 3$; $b^* = 1.5 \pm 3$. A particularly advantageous preferred neutral color is defined as encompassing the following limits:

$$L^* = 34.7 \pm 3; \ a^* = 0 \pm 3; \ b^* = -1.5 \pm 1.5.$$

A metallic silver film of a thickness between 70 and 100 angstroms is used in the filmstack design to achieve high conductivity without visible transmission loss. Silver has near-infrared reflective properties, allowing the product to give good solar performance with respect to reducing heat gain. Resistance of the product can be changed by varying either the silver thickness or the coating parameters or both and is adjusted to compensate for resistance changes due to electric powering, and/or temperature/pressure affects in lamination. Electrical resistance requirements of different power systems can therefore be custom-matched.

An underlayer zinc oxide film coupled with an overlayer zinc oxide film allows greater flexibility in optical properties and reflected color reduction through asymmetric sandwich design. Reflected color of the product is close to conventional non-electrically conducting glare reducing glass used today in substantially all automobiles, yielding almost no startling reflected color perception from the outside to clash with the rest of the vehicle glass, color and trim. The zinc oxide films or layers are both of a thickness in the range of from 350 to 500 angstroms.

High power densities (over one watt per square inch) are possible due to the superior electrical integrity of the product.

The glass sheets may be regular clear glass or, preferably, are comprised of heat absorbing iron oxide-containing glass of the type commercially available, for example, from Libbey-Owens-Ford Co. under the designation "E-Z Eye", and from PPG Industries under the designation "Solex". In an alternative embodiment, one sheet can be composed of clear glass and one sheet can be heat absorbing. In essence, the glass composition and thicknesses (generally in the area of 0.070 to 0.090 inch) and the film layer compositions and thicknesses are chosen to provide the aforesaid color neutrality which is best described as substantially identical in appearance to present day General Motors "Soft Ray" windshields without any electrically conducting film applied thereto. The properties of the window assembly according to this invention include an Illuminant A transmittance greater than or equal to 70 percent, an Illuminant C reflectance from either glass exposed surface less than or equal to 9 percent, a total solar transmittance less than or equal to 45 percent, and a filmed sheet resistance less than or equal to 10 ohms per square. The total solar gain through the window assembly is less than that experienced with present day unfilmed assemblies. A somewhat more specific definition of these properties include an Illuminant A transmittance in the range of 70 to 80 percent, an Illuminant C reflectance in the range of 7 to 9 percent, a filmed sheet resistance in the range of 6 to 9 ohms per square, and a total solar transmittance of between 42 and 45 percent.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a perspective view of a windshield assembly manufactured according to the present invention;

FIG. 2A is an enlarged cross-sectional view taken along the line 2—2 of FIG. 1;

FIG. 2B is a still further enlarged view of the electrically conducting film stack generally shown in FIG. 2A.

FIG. 3 is an enlarged fragmentary plan view of a portion of the windshield assembly shown in FIG. 1.

DESCRIPTION OF THE PREFERRED EMBODIMENT

Figure 4:
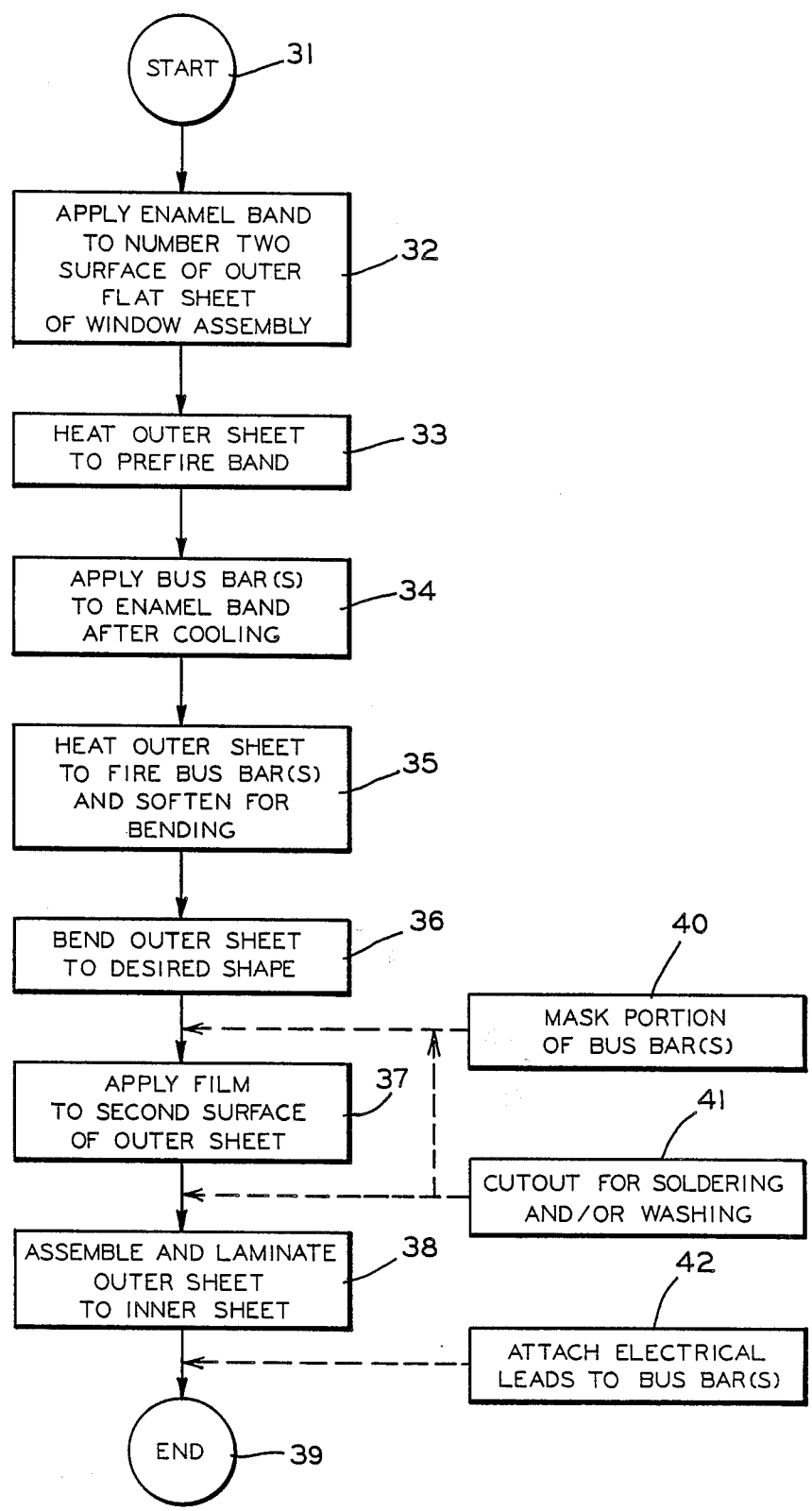
FIG. 4 is a flow diagram of a method of producing an electrically heated windshield assembly according to the present invention.

FIGS. 1-3 show a windshield assembly that is produced by the method in accordance with the present invention. A vehicle windshield assembly 11 includes an outer sheet of glass material 12, an intermediate sheet of plastic material 13 and an inner sheet of glass material 14 all laminated together under heat and pressure to produce an integral unit. For the purposes of reference, the outer and inner surfaces of the glass sheets 12 and 14 are typically designated as first through fourth surfaces. An outer surface 15 of the outer glass sheet 12 is the first or #1 surface, an inner surface 16 of the outer glass sheet 12 is the second or #2 surface, an inboard surface 17 of the inner glass sheet 14 is the third or #3 surface, and an outboard surface 18 of the inner glass sheet 14 is the fourth or #4 surface.

Probably the most widely used form of electrically heated windshield is one in which a sheet of electrically conductive material extends between a pair of nearly parallel extending bus bars. From an aesthetic standpoint, it is desirable to shield or hide the bus bars from view outside the windshield. Thus, a peripheral band 19 of ceramic enamel material is applied, usually by silk screening, to the second surface 16. Materials which have been found to be especially useful in preventing bleed-through are mixtures of ceramic enamels commercially available from Drakenfeld Colors, Washington, Pa. under the designations "24-2189" and "24-2190", and particularly a mixture consisting of fifty percent by weight Drakenfeld 24-2189 and fifty percent by weight Drakenfeld 24-2190. After the bank 19 has been applied and fired, a pair of bus bars are applied on top of the band. An upper bus bar 20 extends across the upper periphery of the windshield assembly 11, down the passenger side of the windshield and along a portion of the bottom of the windshield before terminating in an electrical lead connector section 21. A lower bus bar 22 extends across the lower periphery of the windshield assembly 11 on the band 19 and has an electrical connector section 23 formed therewith. The bus bars 20 and 22 can be formed of a silver material which is typically silk screened in the desired pattern. The outer glass sheet subassembly is heated to fire the bus bars. At the same time, the sheet can be bent to the desired shape for the windshield utilizing a press or gravity bending.

After the outer glass sheet subassembly has been formed, an electrically conductive film 24 is applied to the second surface 16. Typically, the film 24 is formed by sputtering techniques. The film 24 is connected along its upper edge to the upper bus bar 20 and is connected along its lower edge to the lower bus bar 22. As shown in FIG. 1, the edges of the conductive film can extend onto the band 19, but must not contact that portion of the upper bus bar 20 which runs down the passenger's side of the windshield assembly in order to avoid establishing an unwanted electrical circuit. Thus, the portions of the bus bar 20 along the side periphery and the lower periphery must be masked with a masking material 27 (FIG. 3). A pair of electrical leads 25 and 26 can be attached to the connector sections 21 and 23 respectively for connection to the vehicle's electrical system upon installation of the windshield assembly. In order to expose the connector sections 21 and 23 and provide for good solder joint strength, the conductive film 24 and the mask 27 must not cover the sections 21 and 23 and a portion 28 of the glass sheet 14 and intermediate sheet 13 must be cut out. The mask must cover the section 21 to prevent shorting to the other bus bar if any film is present. If the mask is made correctly it will cover the sections 21 and 23.

As previously noted, the film 24 is composed of a number of layers including, generally, a zinc oxide layer 24a on the second surface, a silver metal layer 24b deposited on the layer 24a, and a second zinc oxide layer 24c adjacent the interlayer 13 which interlayer is preferably composed of polyvinyl butyral. In laying down the films, a layer of zinc metal of a thickness in the range of 20 to 40 angstroms is deposited on the silver metal and is shown at 24d. However, this zinc metal layer is subsequently, for the most part if not entirely, oxidized during deposition of the layer 24c and thus is not a preceptible separate layer of the film stack.

A film stack and window assembly in accordance with a preferred embodiment of the invention comprises two glass sheets of nominal 0.090 inch thickness having a nominal composition (percent oxides by weight) of 72.81% $SiO_2$; 8.44% CaO; 3.97% MgO; 13.92% $Na_2O$; 0.01% $K_2O$; 0.19% $SO_3$; 0.475% $Fe_2O_3$; 0.170% $Al_2O_3$; 0.013% $TiO_2$ and 0.009% $Co_3O_4$; a 0.030 inch polyvinyl butyral interlayer, and a film stack comprising two zinc oxide layers each of approximately 400 angstroms in thickness and an interposed 80 angstroms thick silver metal layer. This assembly possessed the following optical, electrical and color properties:

Sheet Resistance 7.5 ohms/square

Illuminant A Transmittance 71.5 percent

Illuminant C Reflectance (from #1 surface) 8.2 percent

Total Solar Transmittance 44 percent

Color ($L^*a^*b^*$) 35,0.76,−1.25

Another window assembly in accordance with the invention comprises one heat absorbing glass sheet (outboard of nominal 0.090 inch thickness; one regular clear glass sheet also of nominal 0.090 inch thickness; a 0.030 inch polyvinyl butyral interlayer; and a film stack comprising two zinc oxide layers each of a thickness in the range of 400 to 450 angstroms and an interposed silver metal layer having a thickness in the range of 75 to 85 angstroms. This assembly possessed the following optical, electrical and color properties:

Sheet Resistance 7.5 ohms/square

Illuminant A Transmittance 76.5 percent

Illuminant C Reflectance (from #1 surface) 8.5 percent

Total Solar Transmittance 51.5 percent

Color ($L^*a^*b^*$) 35.3,0.8,−1.30

Still another window assembly in accordance with the invention comprises two sheets of regular clear glass of nominal 0.090 inch thickness; a 0.030 inch thick polyvinyl butyral interlayer; and a film stack comprising two zinc oxide layers each of a thickness in the range of 400 to 450 angstroms and an interposed silver metal layer having a thickness in the range of 75 to 85 angstroms. This assembly possessed the following optical, electrical and color properties:

Sheet Resistance 9 ohms/square
Illuminant A Transmittance 81.5 percent
Illuminant C Reflectance (from #1 surface) 9 percent
Total Solar Transmittance 62 percent
Color (L*a*b*) 35,1.9,−1.2

The method according to the present invention for producing the windshield assembly 11 is shown in flow diagram form in FIG. 4. The process starts at a circle 31 and enters a first step 32 wherein the enamel band is applied to the number two surface of the outer flat sheet 12 of the window assembly. A next step 33 in the process is to heat the outer sheet to a temperature in the range of 750° F. to 1000° F. to establish desired color development and to prefire the band. Precaution should be observed not to overheat the flat glass to cause optical distortion or loss of flatness. Minimization of glass surface damage should be exercised through this heating process stage. A third step 34 in the process is to apply one or more bus bars to the enamel band after the outer sheet has cooled sufficiently. Typically, the bus bars are formed of a silver material, for example Drakenfeld 24-2189 or a mixture of these type silver solutions, which is silk screened onto the enamel band.

A fourth step 35 in the process is to heat the outer sheet to a temperature in the range of 1000° F. to 1300° F. to fire the bus bars, complete the firing of the enamel band and full color development thereof, and soften the sheet for bending. While the outer sheet is heated, a fifth step 36 is performed wherein the sheet is bent to the desired shape for the final windshield assembly. A sixth step 37 in the process is to apply the conductive film of the invention to the number two surface of the outer sheet. This step may also require masking a portion of the bus bars. A seventh step 38 in the process is to assemble and laminate the outer sheet to an inner sheet of glass which has been bent to the desired shape, i.e., to match the outer sheet. Typically, the lamination is achieved utilizing an intermediate sheet of plastic material, i.e., polyvinyl butyral. The process is then completed at an end circle 39.

The method of forming an electrically heated windshield according to the present invention prevents bleed-through of the bus bar material thereby substantially reducing the rejection rate of outer sheet subassemblies. As previously stated, a portion of the bus bars may require a masking material covering before the film is applied. Thus, an eighth step 40 of masking can be performed between steps 36 and 37. In order to expose the connector sections 21 and 23 for subsequent soldering to the electrical leads 25 and 26, a section of the inner glass sheet and any intermediate plastic sheet must be cut away. Furthermore, after step 36, the outer glass sheet subassembly may require a washing operation to eliminate materials emitted during the prefiring step 33 and/or the firing step 35. Thus, a ninth step 41 is shown in FIG. 4 to indicate that the operations of forming cutouts for soldering and/or washing can be performed between steps 36 and 37 and/or between steps 37 and 38 and possibly before step 33. The cut out step could be performed in the initial cutting of the flat glass sheets. Also shown in FIG. 4 is a tenth step 42 wherein electrical leads are attached to the bus bars. It may be desirable to attach the electrical leads while the window assembly is still heated in order to simulate the temperature to which the window assembly will be heated when the electrical power is applied to the conductive film. In the alternative, the electrical leads can be attached at some later time including the time at which the window assembly is installed in a vehicle.

After step 37 a resistance check before and after powering the filmed sheet can be performed to monitor resistance changes due to powering. Similarly, this step can be repeated after step 38 and/or step 42 to monitor resistance changes due to processing.

Further, instead of prefiring the enamel in step 33 the enamel can be heat or UV dried to the extent that a second printing can be performed to deposit the silver bus bar onto the enamel, step 34.

In addition to the windshield assembly 11 shown in FIGS. 1-3, the present invention can also be utilized to produce a windshield assembly wherein the inner sheet of glass material 14 is replaced by a sheet of transparent material such as a polyester, polycarbonate or polyurethane plastic material. The intermediate sheet 13 can be replaced by a layer of adhesive material.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of forming an electrically heated window assembly, comprising the steps of:
   a. applying to a surface of a first transparent sheet of glass an electrically conducting film stack including a layer of silver metal interposed between layers of zinc oxide, said silver metal layer being of a thickness in the range of 70 to 100 angstroms and said zinc oxide layers being in the range of 350 to 500 angstroms, said filmed sheet having an electrical resistance less than or equal to 10 ohms per square; and
   b. laminating said first sheet to a second transparent sheet with the filmed surface of said first sheet facing said second sheet, the composition and thickness of said transparent sheets and said electrically conducting film being effective after lamination to provide a window assembly having an Illuminant A transmittance greater than or equal to 70 percent, an Illuminant C reflectance less than or equal to 9 percent and a total solar transmittance less than or equal to 45 percent, the window being neutral in color transmittance and substantially free of reflected color.

2. The method according to claim 1, wherein said color has the following CIELAB scale parameters: $L^* = 34.7 \pm 3$; $a^* = 0 \pm 3$; $b^* = 1.5 \pm 3$.

3. The method according to claim 1, wherein said CIELAB scale parameters are: $L^* = 34 \pm 3$; $a^* = 0 \pm 3$; $b^* = -1.5 \pm 1.5$.

4. The method according to claim 2, wherein said first glass sheet is composed of a glare reducing iron oxide-containing heat absorbing glass composition.

5. The method according to claim 2, wherein both said first glass sheet and said second transparent sheet are composed of a glare reducing iron oxide-containing heat absorbing glass composition.

6. A method of forming an electrically heated vehicle window assembly, comprising the steps of:

a. applying a band of opaque heat fusible material to a predetermined peripheral portion of a surface of a relatively flat first sheet of glass;

b. heating said first sheet and said opaque material to a prefire temperature at which said opaque material fuses to said surface;

c. applying an electrically conductive material in a predetermined pattern to said band to define a bus bar means;

d. heating said first sheet and said electrically conductive material to a firing temperature to fuse said bus bar means to said first sheet and bending said first sheet into a desired shape;

e. applying an electrically conductive transparent film to said surface in electrical contact with said bus bar means by depositing on said surface a first layer of zinc oxide to a thickness of between 350 to 500 angstroms, depositing a layer of silver metal on the first zinc oxide layer to a thickness of between 70 to 100 angstroms, depositing a layer of zinc metal on said silver metal layer to a thickness between 20 to 40 angstroms, and depositing a second zinc oxide layer on said zinc metal layer to a thickness of between 350 to 500 angstroms; and f. laminating said first sheet to a second sheet of transparent material with said filmed surface facing said second sheet to form a window assembly.

7. The method according to claim 6, wherein said first glass sheet is composed of a glare reducing iron oxide-containing heat absorbing glass composition.

8. The method according to claim 7, wherein said second transparent sheet is a glare reducing iron oxide-containing heat absorbing glass sheet.

9. The method according to claim 6, wherein said prefire temperature is one in the range of 750° F. to 1000° F.

10. The method according to claim 8, wherein said firing temperature is one in the range of 1000° F. to 1300° F.

11. The method according to claim 6, including a step of forming a cutout in said second sheet adjacent said bus bar means after performing said step d, and a step of attaching electrical leads to said bus bar means after performing said step f.

12. A window assembly adapted to be heated electrically, comprising a first transparent sheet, a transparent electrically conductive film stack on a surface of said sheet, said stack including a layer of silver metal interposed between layers of zinc oxide, said silver metal layer having a thickness between 70 and 100 angstroms and each said zinc oxide layers having a thickness in the range of 350 to 500 angstroms, a bus bar in contact with said film stack, a plastic interlayer adhered to the filmed surface of said first sheet, and a second transparent sheet adhered to the interlayer opposite said first sheet, said transparent sheet and film layer thicknesses being selected to provide said window assembly with an Illuminant A transmittance greater than or equal to 70 percent, an Illuminant C reflectance from either exposed assembly surface of less than or equal to 9 percent, a total solar transmittance less than or equal to 45 percent, and a sheet resistance measured across said film stack of less than or equal to 10 ohms per square, the window being substantially free of reflected color and being neutral in color transmittance.

13. A window assembly according to claim 12, including an opaque band of ceramic enamel material fired on said filmed surface and underlying said bus bar.

14. A window assembly according to claim 12, wherein said color has the following CIELAB scale parameters: $L^*=34.7\pm3$; $a^*=0\pm3$; $b^*=1.5\pm3$.

15. A window assembly adapted to be heated electrically, comprising a first glass sheet, a film stack on a surface of said sheet, said stack including a layer of silver metal interposed between layers of zinc oxide, said silver metal layer having a thickness between 70 and 100 angstroms and each said zinc oxide layers having a thickness in the range of 350 to 500 angstroms, a pair of spaced bus bars, each positioned adjacent a peripheral edge of the first sheet in contact with said film stack, a layer of polyvinyl butyral adhered to the filmed surface of said first glass sheet, and a second glass sheet adhered to the polyvinyl butyral layer opposite said first glass sheet, said glass sheet and film layer thicknesses being selected to provide said window assembly with an Illuminant A transmittance greater than or equal to 70 percent, an Illuminant C reflectance from either exposed glass surface of less than or equal to 9 percent, a total solar transmittance less than or equal to 45 percent, and a sheet resistance measured across said film stack of less than or equal to 10 ohms per square, the window being substantially free of reflected color and being neutral in color transmittance.

16. A window assembly according to claim 12, wherein said glass sheets are of a thickness between 0.070 inch and 0.090 inch.

17. A window assembly according to claim 15, wherein said color has the following CIELAB scale parameters: $L^*=34.7\pm3$; $a^*=0\pm3$; $b^*=1.5\pm3$.

18. A window assembly according to claim 17, wherein both of said glass sheets are of a glare reducing iron oxide-containing heat absorbing composition.

19. A window assembly according to claim 17, wherein said first glass sheet is of a glare reducing iron oxide-containing heat absorbing composition and said second glass sheet is of a regular clear glass composition.

20. A window assembly according to claim 17, wherein both of said glass sheets are of a regular clear glass composition.

21. A window assembly according to claim 17, wherein said color has the following CIELAB scale parameters: $L^*=34.7\pm3$; $a^*=0\pm3$; $b^*=1.5\pm1.5$.

22. A window assembly according to claim 21, wherein said Illuminant A transmittance is in the range of 70 to 80 percent, said Illuminant C reflectance is in the range of 7 to 9 percent, said total solar transmittance is in the range of 42 to 45 percent, and said sheet resistance is in the range of 6 to 9 ohms per square.

23. A window assembly according to claim 18, wherein said Illuminant A transmittance is approximately 71.5 percent, said Illuminant C reflectance is approximately 8.2 percent, said total solar transmittance is approximately 44 percent, said sheet resistance is approximately 7.5 ohms per square, and said color has the following CIELAB scale parameters: $L^*=35$; $a^*=0.76$; $b^*=-1.25$.

24. A window assembly according to claim 19, wherein said Illuminant A transmittance is approximately 76.5 percent, said Illuminant C reflectance is approximately 8.5 percent, said total solar transmittance is approximately 51.5 percent, said sheet resistance is approximately 7.5 ohms per square, and said color has the following CIELAB scale parameters: $L^*=35.3$; $a^*=0.8$; $b^*=-1.30$.

25. A window assembly according to claim 20, wherein said Illuminant A transmittance is approximately 81.5 percent, said Illuminant C reflectance is approximately 9 percent, said total solar transmittance is approximately 62 percent, said sheet resistance is approximately 9 ohms per suqare, and said color has the following CIELAB scale parameters: $L^* = 35$; $a^* = 1.9$; $b^* = -1.2$.

26. A window assembly according to claim 15, wherein said silver metal layer is approximately 75 to 85 angstroms in thickness and said zinc oxide layers are each approximately 400 to 450 angstroms in thickness.

27. A window assembly according to claim 15, including an opaque band of ceramic enamel material fired on said filmed glass surface and underlying said bus bars.

28. A window assembly according to claim 25, wherein said Illuminant A transmittance is in the range of 70 to 80 percent, said Illuminant C reflectance is in the range of 7 to 9 percent, said sheet resistance in the range of 6 to 9 ohms per square, and said total solar transmittance is in the range of 42 to 45 percent.

* * * * *

UNITED STATES PATENT AND TRADEMARK OFFICE
CERTIFICATE OF CORRECTION

PATENT NO. : 4,786,784

DATED : November 22, 1988

INVENTOR(S) : Robert B. Nikodem et al.

It is certified that error appears in the above-identified patent and that said Letters Patent are hereby corrected as shown below:

In the specification:

Column 1, line 52, "a" should read --as--; (1st occurrence)

column 3, line 20, "combinations" should be --compositions--;

column 4, line 7, "filmstack" should read --film stack--;

column 5, line 46, "bank" should be --band--; and column 6, line 50, --)-- should be inserted after "board".

In the claims:

Claim 10, line 37, "8" should read --9--;

claim 16, line 27, "12" should read --15--; and claim 28, line 7, "25" should read --12--.

Signed and Sealed this

Twenty-first Day of March, 1989

Attest:

DONALD J. QUIGG

Attesting Officer

Commissioner of Patents and Trademarks